No. 771,272. PATENTED OCT. 4, 1904.
S. T. RICHARDSON & R. PRICE.
RESILIENT TIRE.
APPLICATION FILED OCT. 30, 1903.
NO MODEL. 2 SHEETS—SHEET 1.
Fig. 1.
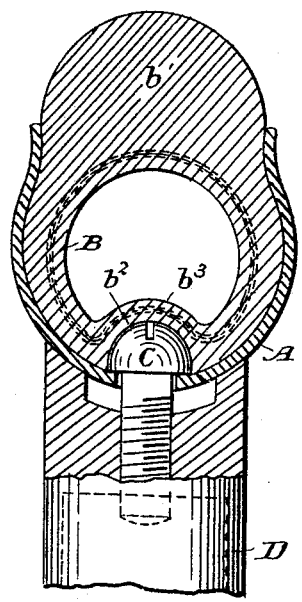
Fig. 2.
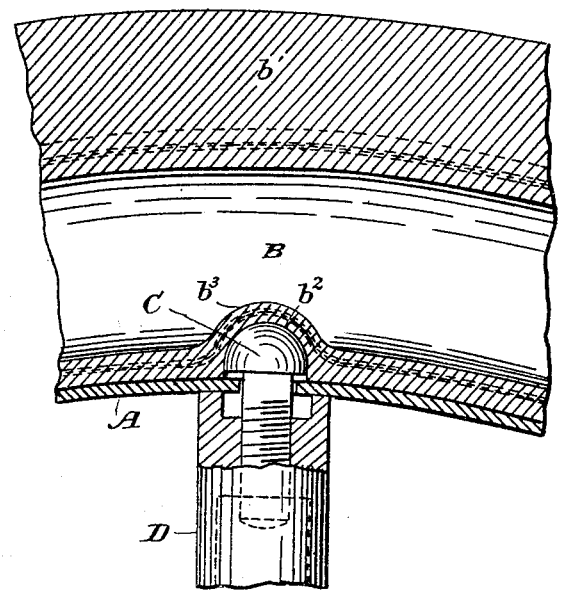
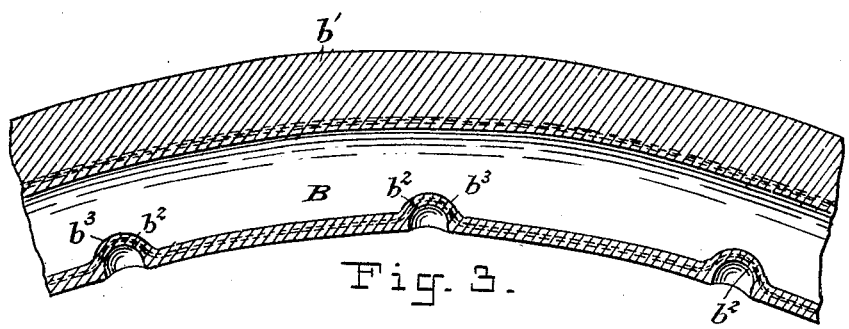
Fig. 3.
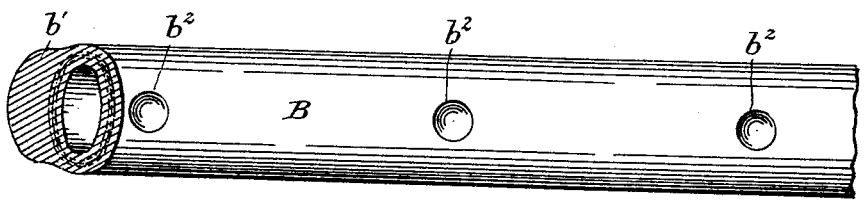
Fig. 4.
Witnesses:
E. B. Bolton
W. M. Kuehne
Inventors:
Sam Thomas Richardson
Richard Price
By Richard ...
their Attorneys.

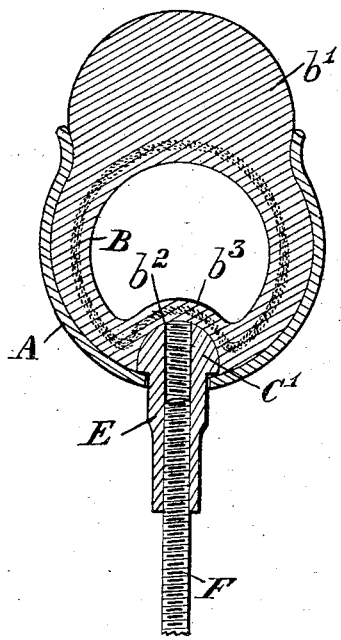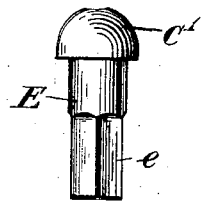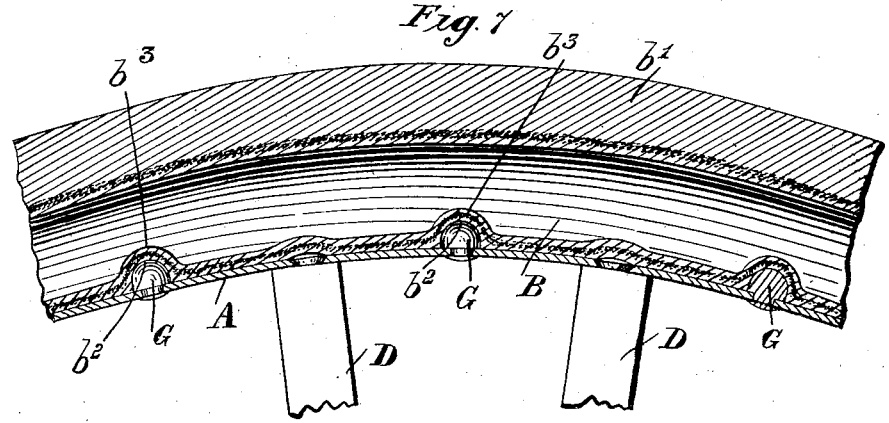

No. 771,272.                                         Patented October 4, 1904.

UNITED STATES PATENT OFFICE.

SAM THOMAS RICHARDSON AND RICHARD PRICE, OF BIRMINGHAM, ENGLAND.

RESILIENT TIRE.

SPECIFICATION forming part of Letters Patent No. 771,272, dated October 4, 1904.

Application filed October 30, 1903. Serial No. 179,215. (No model.)

*To all whom it may concern:*

Be it known that we, SAM THOMAS RICHARDSON and RICHARD PRICE, coach-wheel manufacturers, subjects of His Majesty the King of Great Britain and Ireland and of the British Dominions Beyond the Seas, Emperor of India, both residing at 3a Rea street, in the city of Birmingham, England, have invented certain new and useful Improvements in or Relating to Pneumatic Tires and other Resilient Tires, of which the following is a specification.

This invention has reference more particularly to pneumatic tires of the kind which are known as "single-tube" tires and in which a large portion of the tire is inclosed in the trough-section wheel-rim, the tire being made with a thickened tread which extends through the contracted periphery of the rim; but this invention can also be applied to solid india-rubber and other resilient tires, the object of this invention being to provide simple and efficient means to prevent the tire from creeping along the wheel-rim.

We will describe this invention by referring to the accompanying drawings, on which—

Figure 1 is a cross-section of a single-tube pneumatic tire constructed in accordance with this invention, suitable more particularly for a motor-car or a road-vehicle, this view showing also a cross-section of the wheel-rim and a portion of one of the spokes and the screw which secures the spoke to the wheel-rim. Fig. 2 is a sectional side elevation of the same. Fig. 3 is a sectional side elevation, and Fig. 4 is an inverted plan, of a portion of the pneumatic tire shown in Figs. 1 and 2, but drawn to a smaller scale than are those figures. Fig. 5 is a cross-sectional view showing the same tire and wheel-rim as in the preceding figures, but arranged for wire spokes and nipples. Fig. 6 is a side elevation of the spoke-nipple shown in Fig. 5. Fig. 7 is a side sectional elevation of the same pneumatic tire shown in the preceding figures, but with the wheel-rim differently constructed and forming a modification of our invention.

The same letters of reference indicate the same or corresponding parts in all the figures.

A is the trough-section wheel-rim, and B is the single-tube pneumatic tire, the solid india-rubber tread part $b'$ of which protrudes through the trough of the rim.

In carrying out this invention we provide in the bottom of the trough-section wheel-rim A a series of projecting studs, such as C, preferably of a dome shape and arranged at regular intervals apart all round the wheel-rim, and in the pneumatic tire B we provide a series of corresponding depressions, such as $b^2$, made of the same shape as the studs C and at the same distances apart, so that when the tire B is placed in position in the trough-section wheel-rim, as in Figs. 1 and 2, and inflated these studs or projections C will take into the holes or depressions $b^2$ in the tire B and effectually prevent the same from creeping. As will be seen by the drawings, the depressions $b^2$ are molded in the tire, so that there are corresponding domed projections $b^3$ in the interior of the tire, and the thickness of the tire is not in any way diminished at the depressions $b^2$. The projecting studs C in the rim A may be formed in various ways—as, for instance, they may, as shown in Figs. 1 and 2, be the heads of the screws which secure the spokes to the wheel-rim. A portion of one of the spokes is here shown and marked D, or, as shown in Fig. 5, the said projections, one of which is here shown and marked C', is the head or end of the nipple E, which secures the spokes to the wheel-rim. In this figure one of the nipples E is shown and also one of the wire spokes F, and this nipple E has a domed head C' at the bottom of the interior of the trough A, corresponding with and to take into the corresponding depressions $b^2$ in the pneumatic tire, or, as shown in Fig. 7, the said studs, which in this case are marked G, are entirely separate from the spokes D and are riveted to the wheel-rim A at the proper distances apart to correspond with the depression $b^2$ in the tire. Our invention is similarly applied to solid india-rubber and like resilient tires which we make with depressions similar to $b^2$ round their inner periphery to take onto corresponding projections—such as C or C' or G or I—in the wheel-rim to prevent creeping, as above described.

What we claim as our invention, and desire to secure by Letters Patent, is—

1. A pneumatic tire or other resilient tire made with depressions such as $b^2$ on its inner periphery at regular intervals apart and adapted to engage with corresponding studs or projections at the bottom of the trough-section wheel-rim so as to prevent the tire from creeping, said depressions forming dome-shape projections in the interior of the tire, substantially as set forth.

2. The improved single-tube pneumatic tire consisting of the air-inflated portion B to be inclosed within the rim, the thickened tread part $b'$ to project beyond the same and having the depressions $b^2$ formed at regular intervals round the inner periphery of the air-inflated part, said depressions forming dome-shaped projections in the interior of the portion B.

In witness whereof we have hereunto set our hands in presence of two witnesses.

SAM THOMAS RICHARDSON.
RICHARD PRICE.

Witnesses:
CHARLES BOSWORTH KETLEY,
THOMAS JOHN ROWE.